US010110122B2

(12) United States Patent
Bari et al.

(10) Patent No.: US 10,110,122 B2
(45) Date of Patent: Oct. 23, 2018

(54) TRANSIENT PERFORMANCE IMPROVEMENT FOR CONSTANT ON-TIME POWER CONVERTERS

(71) Applicant: Virginia Tech Intellectual Properties, Inc., Blacksburg, VA (US)

(72) Inventors: Syed Bari, Blacksburg, VA (US); Fred C. Lee, Blacksburg, VA (US); Qiang Li, Blacksburg, VA (US); Pei-Hsin Liu, Blacksburg, VA (US)

(73) Assignee: Virginia Tech Intellectual Properties, Inc., Blacksburg, VA (US)

(*) Notice: Subject to any disclaimer, the term of this patent is extended or adjusted under 35 U.S.C. 154(b) by 49 days.

(21) Appl. No.: 14/674,704

(22) Filed: Mar. 31, 2015

(65) Prior Publication Data
US 2015/0280556 A1 Oct. 1, 2015

Related U.S. Application Data

(60) Provisional application No. 61/973,600, filed on Apr. 1, 2014.

(51) Int. Cl.
*H02M 3/156* (2006.01)
*H02M 1/14* (2006.01)
*H02M 3/157* (2006.01)

(52) U.S. Cl.
CPC .............. *H02M 3/156* (2013.01); *H02M 1/14* (2013.01); *H02M 2003/1566* (2013.01)

(58) Field of Classification Search
CPC ......... H02M 2001/0032; H02M 3/156; H02M 3/158; H02M 3/1584; H02M 3/1586; H02M 3/1588; H02M 3/157; H02M 2003/1566
See application file for complete search history.

(56) References Cited

U.S. PATENT DOCUMENTS

| | | | | |
|---|---|---|---|---|
| 3,986,100 A | * | 10/1976 | Beierholm | H02P 27/06 323/285 |
| 5,625,279 A | * | 4/1997 | Rice | H02M 3/156 323/283 |
| 7,584,371 B2 | * | 9/2009 | Zhang | G05B 19/0423 323/318 |
| 7,772,904 B1 | | 8/2010 | Cooke | |
| 7,796,370 B1 | * | 9/2010 | Wruble | H02H 5/005 361/111 |
| 7,834,606 B2 | * | 11/2010 | Liu | H02M 3/157 323/283 |

(Continued)

*Primary Examiner* — Gary L Laxton
(74) *Attorney, Agent, or Firm* — W&C, IP

(57) ABSTRACT

Response of a variable frequency switching constant on-time or adaptive on-time controlled power converter to a large step-up or step-down change in load is improved with a simple circuit that detects magnitude and polarity of a change in output voltage and initiates, extends or terminates conduction of power pulses from an input source through said power converter. Both the amplitude and duration of undershoot or overshoot of the transient response are reduced or, alternatively, the capacitance of an output filter may be significantly reduced and still provide comparable transient performance. The fast adaptive on-time control is applicable to multi-phase power converters using phase managers or one or more phase-locked loops for interleaving of power pulses.

19 Claims, 13 Drawing Sheets

(56) References Cited

U.S. PATENT DOCUMENTS

| | | | |
|---|---|---|---|
| 7,863,875 B1* | 1/2011 | Guo | H02M 3/1584 |
| | | | 323/275 |
| 9,520,777 B2 | 12/2016 | Chen | |
| 2012/0306586 A1 | 12/2012 | Wan | |

* cited by examiner

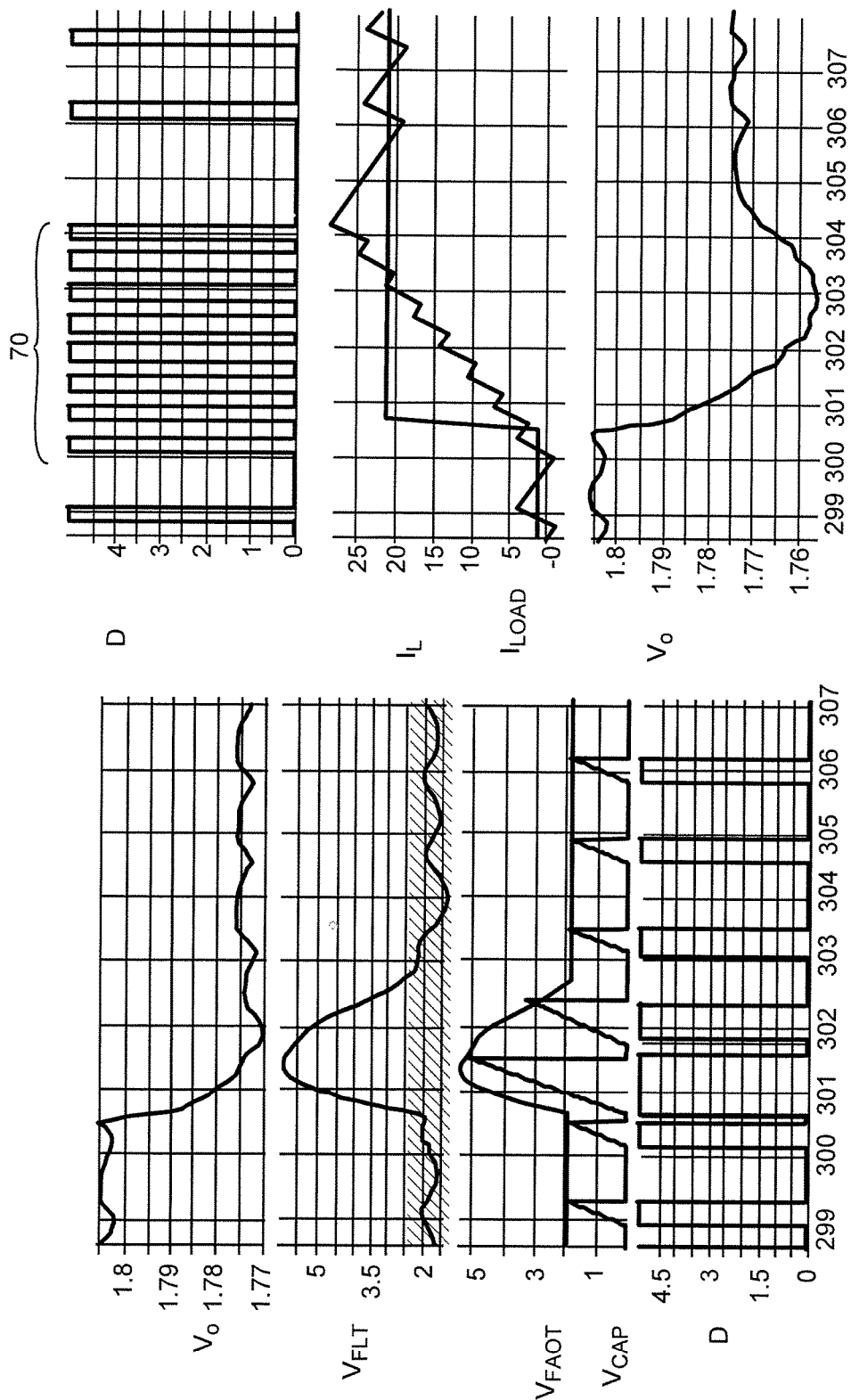

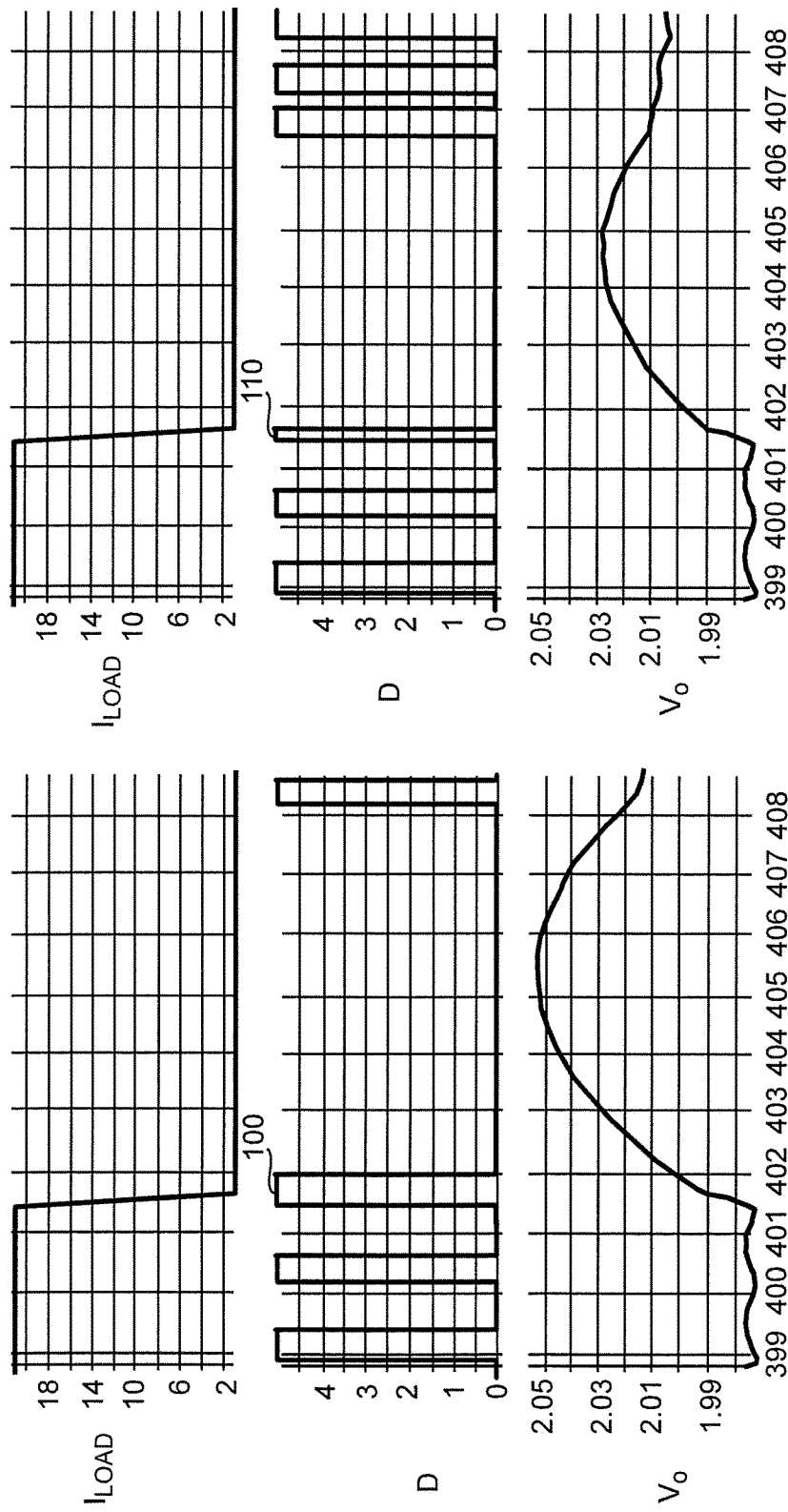

TRANSIENT PERFORMANCE IMPROVEMENT FOR CONSTANT ON-TIME POWER CONVERTERS

CROSS-REFERENCE TO RELATED APPLICATIONS

This application claims benefit of priority of U.S. Provisional Patent Application 61/973,600, filed Apr. 1, 2014, which is hereby incorporated by reference in its entirety.

DESCRIPTION

Field of the Invention

The present invention generally relates to variable frequency switching power converters and voltage regulators and, more particularly, to constant on-time power converters and voltage regulators and the improvement of transient response to changes in power delivered to a load.

Background of the Invention

Virtually all electronic apparatus including semiconductor devices require direct current power at a substantially constant voltage which may be regulated within a specified tolerance even when the current drawn by a load may vary over a wide range. For example, digital processor semiconductor integrated circuits operating at high clock rates may require very substantial amounts of power at very closely regulated voltage for short periods of time between possibly extended periods in a substantially stand-by state during which very little power is drawn. Such power is generally provided from another direct current power source at a voltage which may be subject to significant variation and must be converted to the voltage and current required by a load circuit with as high efficiency as possible. Consequently, variable frequency switching power converters have been widely used because of their characteristic high efficiency at light loads since switching frequency and consequent switching losses are reduced when power delivered to a load is reduced.

Among the various arrangements known for operation as variable frequency power converters are constant on-time (COT) power converters in which power is supplied from an input power source for short and constant periods of time as needed (between periods of at least a minimum duration when power from an input source is interrupted and so-called freewheel current is supplied from an inductor) to maintain a specified output voltage from an output filter such as a filter capacitor as can be easily determined by a very simple comparator circuit and a source of a reference voltage. Such a filter capacitor also serves to supply power to a load when the current drawn by the load increases sharply. Conversely, the filter capacitor serves to reduce output voltage increase when the current drawn by the load is sharply reduced. However, filtering voltage changes during such transient changes in load may require very large charge storage capacity of the output filter; limiting power density and increasing cost of the power converter. Moreover, transient response of constant on-time (COT) power converters may be largely unpredictable depending on the relative timing of a load transient and the constant duration periods during which power is drawn from the input power source.

For example, when a large increase in load power occurs, the power converter response is limited by the constant on-time power pulses and the limitation of switching duty cycle imposed by the maximum switching frequency available and the minimum off-time alluded to above; generally resulting in undershoot of the voltage response to a large transient increase in required power. The degree of undershoot will be increased if the increased load transient occurs at or very shortly after the end of a constant on-time power pulse since the power converter cannot respond at all until the minimum off time has elapsed. Conversely, if load power is transiently reduced at or shortly after the onset on a constant on-time power pulse, the power converter current (e.g. inductor current) supplying power to the filter will continue to increase until the end of the power pulse; causing voltage overshoot.

In COT converters, the duration of the power pulse can generally be freely chosen to meet power requirements of a given load. Accordingly, so-called adaptive on-time (AOT) control has been widely used for applications in which the load transients are relatively infrequent or small. In AOT control, the duration of the power pulses is adaptively adjusted in steady state operation to alter the switching duty cycle and maintain a nearly constant switching frequency while operating in a manner that is otherwise very similar to COT control. However, since the duration of the power pulses may be very long or very short in steady state operation and is only adjusted slowly, the degree of overshoot and undershoot when a large load transient occurs is substantially increased. Thus, while COT and AOT control is attractive for many applications, the transient response has remained intractable.

SUMMARY OF THE INVENTION

It is therefore an object of the present invention to provide an arrangement to increase or decrease on-time very quickly upon occurrence of large step-up or step-down load transients during constant on-time (COT) operation of a power converter with a single simple control circuit that holds magnitude of undershoot and overshoot and the likelihood of ringing to a very low level and does not affect the small signal properties of COT control and can be simply implemented in an integrated circuit.

In order to accomplish these and other objects of the invention, a power converter is provided including a power stage including a switching arrangement and an inductor, a circuit for controlling on-time of the switching arrangement, a detector for detecting a load transient, and a control generator responsive to the detector for interrupting operation of the circuit for controlling on-time of the switching arrangement.

In accordance with another aspect of the invention, a method of improving transient response of a power converter using constant on-time or adaptive on-time control to provide power pulses to an output of the power converter is provided comprising steps of monitoring an output voltage of the power converter, (preferably high frequency) bandpass filtering the output voltage, determining polarity of a result of the filtering step, and if the polarity of the result is of a first polarity, initiating or extending a power pulse to the output, or if the polarity of the result is of a second polarity, terminating a power pulse to the output.

BRIEF DESCRIPTION OF THE DRAWINGS

The foregoing and other objects, aspects and advantages will be better understood from the following detailed description of a preferred embodiment of the invention with reference to the drawings, in which:

FIG. 6 illustrates operational waveforms of the circuit of FIG. 5 during a step-up load transient, FIG. 7 illustrates operational waveforms of a power converter during a step-up load transient without fast adaptive on-time control, FIG. 10 illustrates operational waveforms of a power converter during a step-down load transient without fast adaptive on-time control, FIG. 11 illustrates operational waveforms of a power converter during a step-down load transient with fast adaptive on-time control.

DETAILED DESCRIPTION OF A PREFERRED EMBODIMENT OF THE INVENTION

Figure 1A:
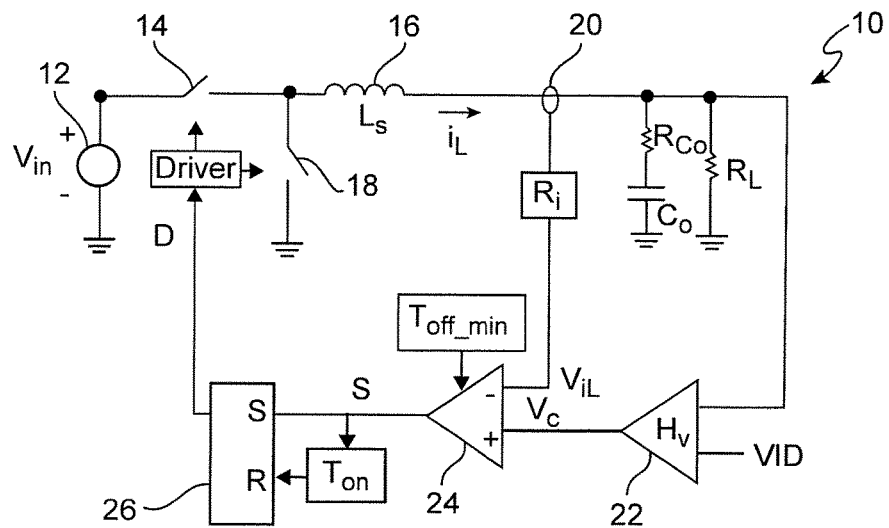
FIG. 1A is a schematic diagram of an exemplary power converter circuit employing constant on-time (COT) control.
Figure 1B:
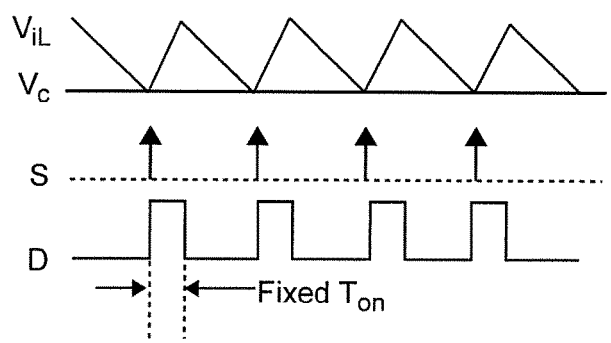
FIG. 1B illustrates operational waveforms of the power converter of FIG. 1A.
Figure 2:
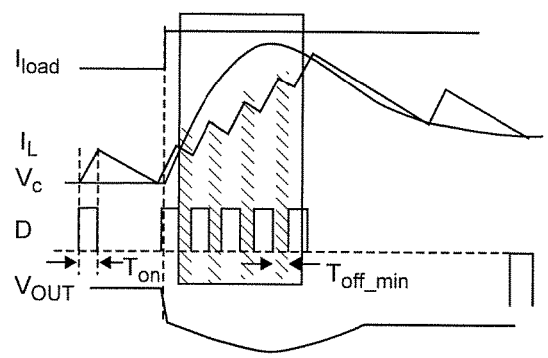
FIG. 2 illustrates the problem of undershoot during a load step-up transient.
Figure 3:
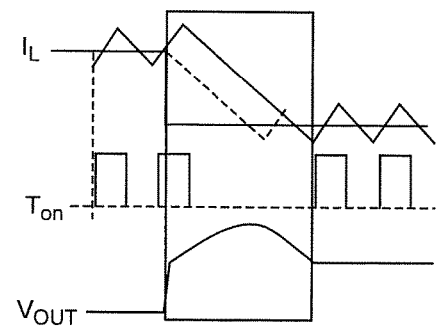
FIG. 3 illustrates the problem of overshoot during a load step-down transient.

Referring now to the drawings, and more particularly to FIG. 1A, there is shown a generalized schematic diagram of an exemplary constant on-time (COT) control power converter 10 useful for understanding the transient response problem addressed by the invention which is illustrated in FIGS. 2 and 3. Operational waveforms of this power converter are illustrated in FIG. 1B. Since this schematic diagram is both generalized and arranged to facilitate an understanding of the invention, no portion of any of FIGS. 1A-3 is admitted to be prior art in regard to the invention. However, since the invention and its operation are not illustrated therein, these Figures have been labeled "Related Art". It should also be understood that while a so-called buck converter is illustrated in these and other Figures for simplicity and general familiarity to those skilled in the art, the invention is fully applicable to any known or foreseeable power converter topology.

As is well understood in the art, a buck converter delivers power from a power source 12 through an intermittently closed so-called top switch 14 to inductor 16 which is connected to an output filter (depicted as a capacitor $C_o$ and parasitic resistance $R_{C_o}$) and load $R_L$, depicted as a simple resistor although the load may include reactive components and/or characteristics. So-called bottom switch 18 is operated in a complementary fashion to top switch 14 so that when top switch 14 is opened, a "freewheel" current is provided to inductor 16 from the current return path of the power converter through bottom switch 18. Thus, when top switch 14 is closed, the current through inductor 18 increases and a linearly increasing voltage is developed across inductor 18 that "bucks" the voltage applied from power input source 12. When top switch 14 is opened and bottom switch 18 is closed, the voltage developed across inductor 18 will continue to deliver power to the load while voltage will linearly decrease. The increase and decrease in voltage across inductor 18 appear as a ripple in the output voltage of the converter and the ripple is reduced in magnitude to an arbitrarily low level by the output filter. The filtered output voltage including the ripple voltage is then compared with a reference voltage, VID, at comparator 22 that, in the absence of providing constant on-time control, can be used to directly control the operation of top and bottom switches 14 and 18. That is, when the load current and the ripple voltage causes the output to diminish to the reference voltage, the output, $V_c$, of comparator 22 will increase and control top switch 14 to supply power from the input power source to inductor 18 to maintain the output voltage at the desired (e.g. average) level.

As is well-understood in the art, using COT control the magnitude of the ripple voltage may become very small at light loads and allow power pulses to be initiated by small voltage fluctuations or noise, causing a jittering of the power pulses and unstable operation that does not accurately match load power requirements. To provide COT control in a stable fashion, an additional ramp signal, $V_{iL}$, is developed by sensing the linearly increasing and decreasing inductor current with sensor 20 (which is more reliable than sensing a low-level ripple voltage that may contain noise) to which transfer function Ri is applied and compared with control voltage $V_C$ at comparator 24 to initiate a COT power pulse when $V_{iL}$ diminishes to equal $V_C$ at times S as shown in FIG. 1B after a minimum off time has elapsed (e.g. after the termination of the previous power pulse). A constant on-time can be established in many ways that will be apparent to those skilled in the art but, for simplicity and convenience of illustration, is illustrated as being established by a set-reset flip-flop with a delay (e.g. an AND gate with an RC circuit between the inputs) imposed between the set and reset inputs) to provide a pulse train, D, to control the switches 14 and 18.

Use of the additional ramp and transfer function allows very high control bandwidth design and the transient response can be made very fast to allow the overshoot or undershoot to settle to steady state fairly quickly. However, as will now be discussed in connection with FIGS. 2 and 3, the transient response can still be unacceptably slow and of unpredictable magnitude, as alluded to above, particularly for providing power to state-of-the-art semiconductor devices that may require power at low voltages and stringent regulation tolerances.

Specifically and referring now to FIG. 2 (which may be regarded as an extension to the right of FIG. 1B with additional $I_{load}$ and $V_{out}$ waveforms), when a load step-up transient occurs, the output voltage, $V_{out}$, is pulled down abruptly by the increased load current drawn and the control voltage $V_c$ rises sharply. The constant power pulse width, $T_{on}$, is, however, fixed as is the minimum off-time, $T_{off\_min}$, and the duty cycle, D, becomes saturated while $I_L$ is still incapable of being kept above $V_c$. That is, when $I_L$ is below $V_c$, their intersection cannot cause initiation of a further power pulse, but, rather, further power pulses are initiated immediately after a minimum off-time, $T_{off\_min}$, the time required to charge the bootstrap capacitor of the high side gate driver controlling the top switch and fixed by the system power stage and load, has elapsed. Once $I_L*R_i$ has again exceeded $V_c$, The duty cycle, D, may fall below saturation and steady state operation resumed. It can clearly be seen that when $T_{on}$ is relatively short and $T_{off\_min}$ is relatively long, the undershoot of the transient response can be quite large and subject to unpredictable variation, depending on where the load step-up transient occurs in the duty cycle, D, waveform.

Somewhat similarly, in the load step-down case, for a given power stage or converter topology, overshoot can be very large if the load transient occurs at or shortly after the beginning of a fixed duration power pulse, $T_{on}$. In FIG. 3, the load step-down transient occurs just after the beginning of the a power pulse. $V_{out}$ initially rises very sharply since the average current into the filter stage greatly exceeds the current drawn and the portion of the COT power pulse after the transient causes $V_{out}$ to be pushed even higher, causing overshoot, as shown by comparison with the dashed line that $I_L$ would desirably follow if the power pulse was terminated by the step-down load transient. It can be easily understood that the degree of overshoot will be larger for longer $T_{on}$ and duration subsequent to the step-down load transient.

Figure 4:
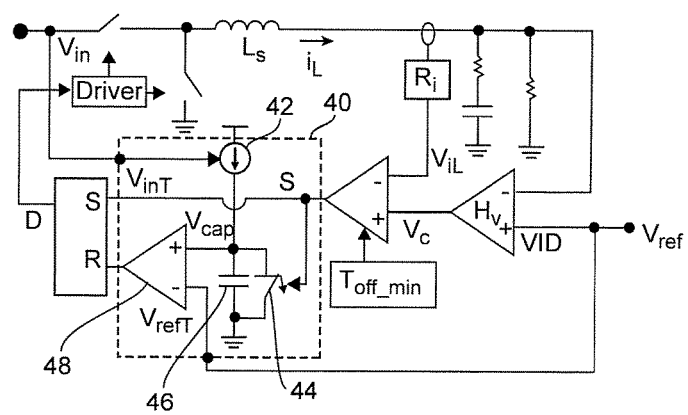
FIG. 4 is a schematic diagram of an exemplary power converter circuit employing adaptive on-time (AOT) control.

COT control implies variable frequency since off-time decreases to increase duty cycle as load increases and vice-versa. While low switching frequency increases efficiency for light loads, it can be a drawback in many applications since the required frequency variation range can be very large r Large frequency variation also makes electromagnetic interference (EMI) filter design very difficult. To alleviate problems that may arise from COT control requiring widely varying frequency, so called adaptive on-time (AOT) control has been employed and is widely used in the voltage regulator (VR) industry. FIG. 4 schematically illustrates a generalized architecture for an AOT control power converter, again using a buck converter topology for simplicity and familiarity to those skilled in the art. As with FIGS. 1A-3, FIG. 4 is generalized and arranged to facilitate an understanding of the problems addressed by the invention and, for that reason, no portion of FIG. 4 is admitted to be prior art in regard to the present invention and FIG. 4 has thus also been labeled "Related Art".

Essentially AOT control is very similar to COT control except that $T_{on}$ may be adaptively changed to allow frequency range to be reduced and, preferably, to assume a nearly constant frequency with duty cycle, D, altered in accordance with the input voltage and the VID or $V_{ref}$ command to accommodate small or gradual changes in load over the entire load range.

The AOT control circuit is enclosed within dashed line 40 while the remainder of the power converter is identical to that shown for the COT control power converter as shown in FIG. 1A and discussed above although many variations will be apparent to those skilled in the art. The signal, S, that initiates power pulses is generated as discussed above but is also used to control discharging of capacitor 46. As illustrated, the input voltage $V_{in}$ is input as $V_{inT}$ to control a variable current source 42 providing charging current to capacitor 46 to provide a voltage ramp signal as a positive input to amplifier 48. The voltage control command VID or $V_{ref}$ is also applied as a negative input, $V_{refT}$, to amplifier 48; the output of which terminates each power pulse with an input to the reset input of a flip-flop. Thus, the current source 42, capacitor 46 and amplifier 48 function in the manner of the delay circuit determining $T_{on}$ in FIG. 1 as discussed above with the difference that $T_{on}$ is now variable. Thus, it can be appreciated that when operating at steady state where $T_{on}$ is substantially constant or only slowly varying, operation is substantially the same as in COT control. However, it can also be appreciated that $T_{on}$ can become very short and comparable to $T_{off\_min}$ at small duty cycle and cause an even larger undershoot for a step-up load transient than caused by COT control. Conversely, $T_{on}$ can also become very long at high duty cycle and cause even larger overshoot than under COT control when large step-down load transients occur. The magnitude of overshoot and undershoot remains unpredictable, depending of the time of occurrence of the load transient relative to the leading or trailing edge of a power pulse for the same reasons discussed above in connection with FIGS. 2 and 3.

Figure 5:
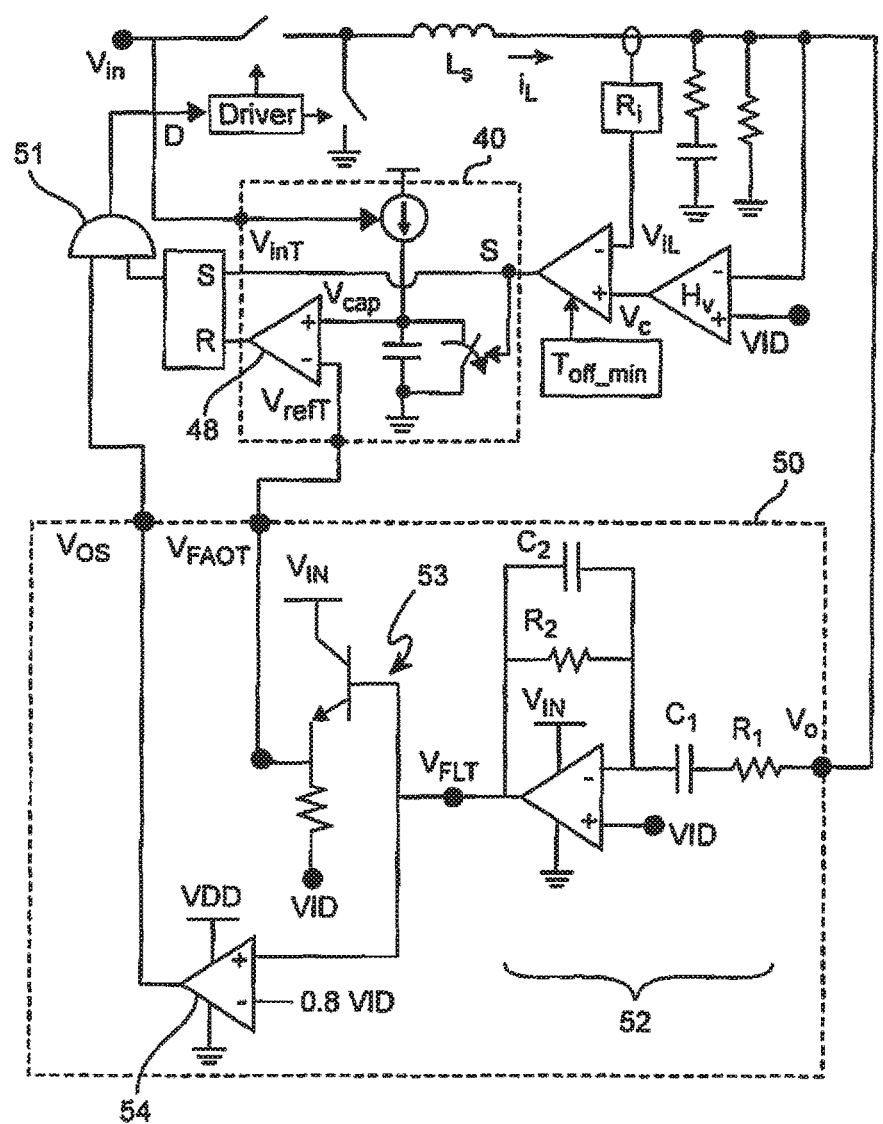
FIG. 5 is a generalized schematic diagram of a power converter circuit in accordance with the invention and providing fast adaptive on-time (FAOT) control.

Referring now to FIG. 5 the methodology and apparatus for producing fast adaptive on-time (FastAOT or FAOT) control in accordance with the invention will now be explained. The basic concept of FAOT is to increase or decrease $T_{on}$ immediately upon occurrence of a load transient. It will be noted that the upper portion of FIG. 5 is identical to the AOT control implementation shown in FIG. 4 including the AOT signal generator 40, described above with the addition of an AND gate 51 to provide pulse train D to the switch driver circuit. The basic difference is that a FAOT control generator 50 is provided and produces a $V_{FAOT}$ signal as a reference voltage for amplifier/comparator 48 and a signal $V_{OS}$ to the added AND gate 51.

Figures 8, 9:
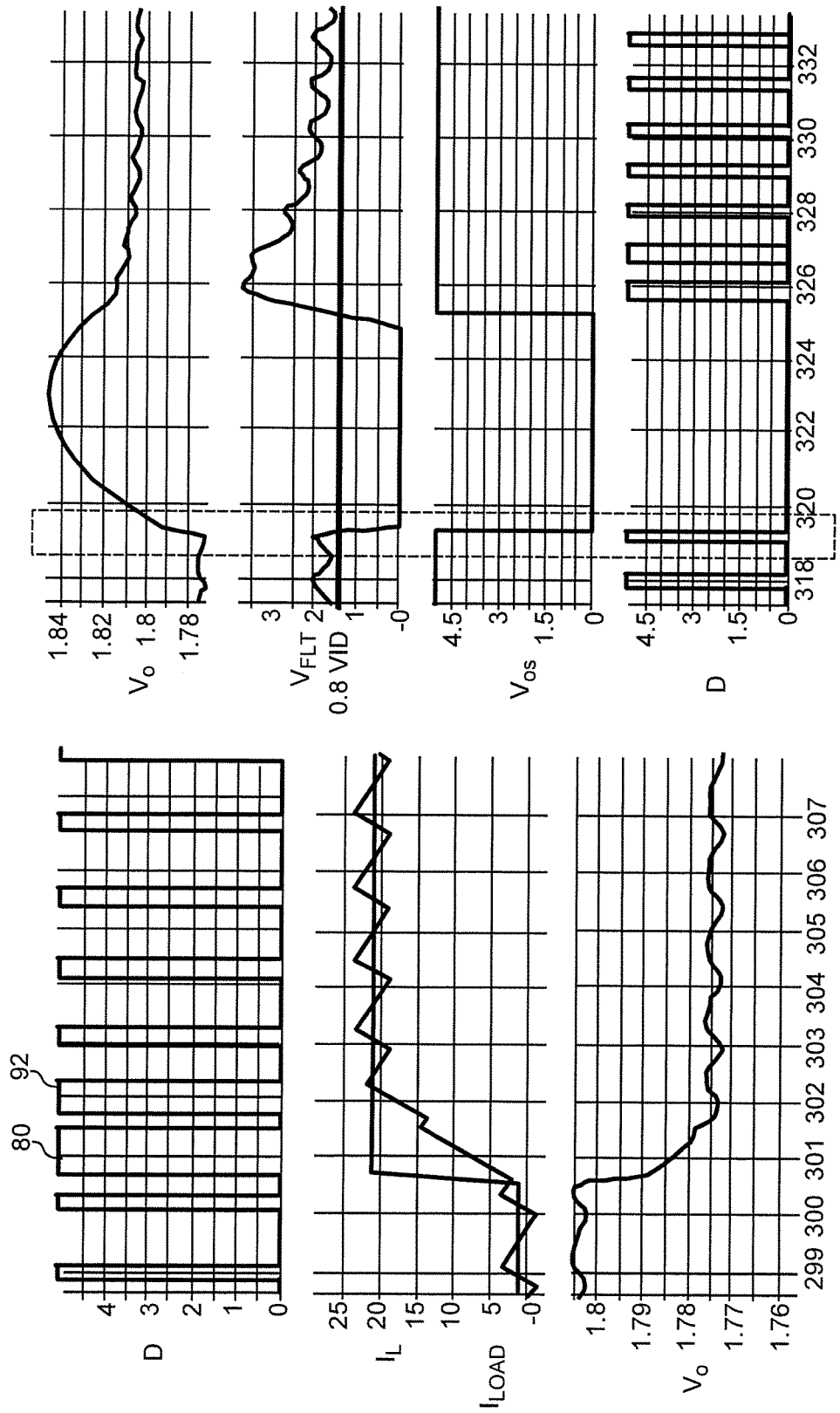
FIG. 8 illustrates operational waveforms of a power converter during a step-up load transient with fast adaptive on-time control.
FIG. 9 illustrates operational waveforms of the circuit of FIG. 5 during a step-down load transient.

The FAOT control generator 50 includes a preferably active, band pass filter 52, preferably at a high frequency (preferably sufficiently high to pass the highest anticipated slew rate of the load transient with relatively low attenuation), referenced to VID (or that detects the initial abrupt change in (or $V_{ref}$) and passes only the high frequency part of the voltage change, $V_{FLT}$, as shown in FIG. 6, to the emitter follower stage 53, referenced to VID or $V_{ref}$, which truncates or blocks the low level, high frequency ripple in $V_{FLT}$ as shown in FIG. 6. Thus only the large peak in $V_{FLT}$ remains as $V_{FAOT}$ which is applied to amplifier/comparator 48. It should also be noted that the fall-time of the peak is significantly longer than the rise-time. A fast rise-time is an important capability of the invention to provide fast transient response while a longer duration fall time provides a smooth and seamless return to steady-state operation which is a distinct advantage over use of a differentiator circuit for transient detection. Since $V_{FAOT}$ is used as a reference for amplifier/comparator 48, the ramp generator supplying $V_{cap}$ is allowed to charge to a higher value over an extended period of time as shown in waveform D of FIG. 6 and immediately increase $T_{on}$ as can be seen in a comparison of operational waveforms in Related Art FIG. 7 (without FAOT) and FIG. 8 (with FACT). (To apply the invention to a COT control power converter rather than an ACT control power converter, $V_{FOAT}$ would simply be applied to disable or interrupt the output of the delay $T_{on}$ in FIG. 1; producing precisely the same effect.) In FIG. 7, without the FAOT circuit, the duty cycle becomes saturated during interval 70 while increase of actual load current, $I_{load}$, is slowed by the minimum off-time periods and causes $V_o$ to be pulled down, causing a large undershoot. In FIG. 8, it is seen that power pulses 80 and 92 have an extended $T_{on}$, allowing $I_{load}$ to increase much more rapidly and hold the undershoot to a much lower level.

In the case of a step-down load transient, the FAOT circuit band pass filter circuit detects a load transient as described above but since this transient is a step-down transient, $V_{FLT}$ diminishes very quickly, the emitter follower circuit 53 is turned off and no $V_{FAOT}$ signal is delivered. Rather, $V_{FLT}$ is delivered to a comparator that is referenced to a non-critical, user determined fraction (e.g. 80%) of the VID (or $V_{ref}$) signal (as can be provided from a simple voltage divider). This comparison is, again, essentially a threshold for truncation of $V_{FLT}$ and ripple elimination as shown in FIG. 9 such that a value of $V_{FLT}$ above that fraction will have no effect on overshoot or undershoot but values below that fraction of VID, indicating a magnitude of step-down transient that will cause an undesirable degree of overshoot) will keep the output of comparator 54 high and allow the duty cycle waveform, D, to operate in a normal manner through AND gate 51. Provision of this comparison also allows the magnitude of step-up or step-down transient that causes operation of FAOT circuit 50 to be adjusted as desired. However, when $V_{FLT}$ falls below that level, the output of comparator 54 drops to a low level and blocks waveform D as shown in the respective waveforms of FIG. 9.

It should also be appreciated from the above discussion of FIG. 5 that the polarity of $V_{FLT}$ effectively selects circuit 53 or 54 to extend or terminate a power pulse, respectively. By the same token, either of circuits 53 or 54 could be omitted if it is desired to apply FAOT exclusively to step-up or step-down load transients.

As will be evident to those skilled in the art, the components of the FAOT circuits have very simple functions and can be embodied in many ways other than those illustrated in FIG. 5. This blocking action can be performed at any time and immediately upon occurrence of a step-down load transient, including a time within a COT or AOT control pulse S to immediately interrupt a power pulse as can be seen from a comparison of power pulses 100 of FIG. 10 and 110 of FIG. 11 to significantly reduce the overshoot that would otherwise occur. It should also be noted from a comparison of FIGS. 10 and 11 that the overshoot is reduced in both magnitude and duration and is thus much less likely to cause the output voltage to lose regulation or exceed regulation tolerance.

Figure 12A:
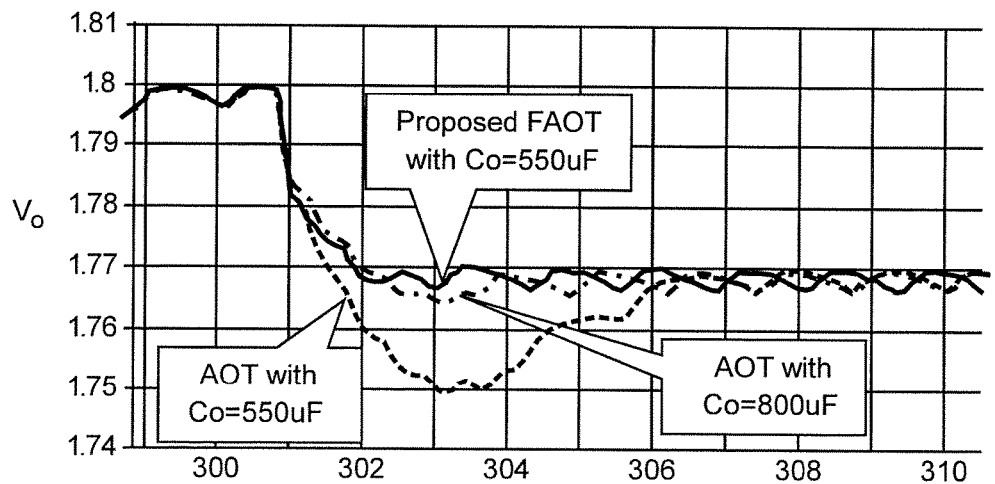
FIGS. 12A and 12B illustrate reduction of required filter capacitance for comparable undershoot and overshoot performance, respectively, with and without the invention, FIG. 13 schematically illustrates an alternative embodiment of the invention.
Figure 12B:
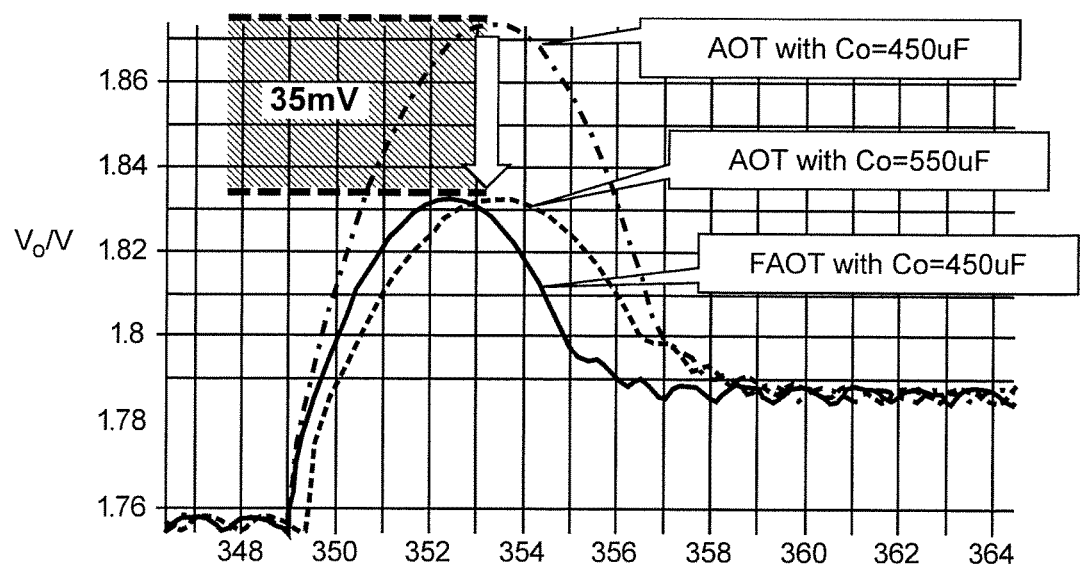

Referring now to FIGS. 12A and 123, while the magnitude of undershoot and overshoot are largely unpredictable because of the random timing of load transients, a quantitative evaluation of the improvement in transient response can be obtained by considering the reduction in output filter capacitance required to obtain substantially equivalent transient response performance with and without FAOT in accordance with the invention. FIG. 12A compares transient response using FAOT to AOT control without FAOT using the same and larger filter capacitances in the case of a step-up load transient. It can be seen that the same capacitance value yields a significantly larger undershoot and that a larger capacitor is required to obtain substantially equivalent performance. Conversely, use of FAOT in accordance with the invention allows an approximately 30% reduction in filter capacitance. Similarly, FIG. 12B illustrates transient responses for step-down load transients with and without FAOT for different capacitances. In this case, while improvement in overshoot reduction with equal filter capacitance is 35 mV which may seem small, the invention provides a 35% reduction in filter capacitance to achieve comparable magnitude of overshoot while FAOT further reduces the duration of overshoot significantly compared to AOT and a larger filter capacitor.

In view of the foregoing, it is clearly seen that the invention provides substantial reduction in undershoot and overshoot while still maintaining the advantages of COT and/or AOT control using a single, simple circuit that can easily be retrofit into any COT or AOT control power converter where suitable connections to the power converter are accessible. Additionally, since the change of $T_{on}$ is proportional to the output voltage change, the likelihood of ring back or other unstable behavior is greatly reduced such as where the $T_{on}$ change increment and/or decrement is predefined. Moreover, the magnitude of the effective $T_{on}$ increment can be adjusted very simply by adjusting the gain of band pass filter 52. Further, since alteration of $T_{on}$ occurs only during the transient period when the duty cycle would otherwise be saturated, the invention does not affect the small signal properties of COT control. Moreover, the FAOT circuit can be implemented in many ways including the preferred implementation illustrated in FIG. 5, without requiring any negative voltage to be present; allowing the FAOT circuit to be informed or included within an integrated circuit.

The basic principles and operation having been described in detail above, several additional and exemplary implementations will now be discussed which will provide some additional performance advantages and/or particular suitability for various applications. Other variant implementations will become apparent to those skilled in the art.

Figure 13:
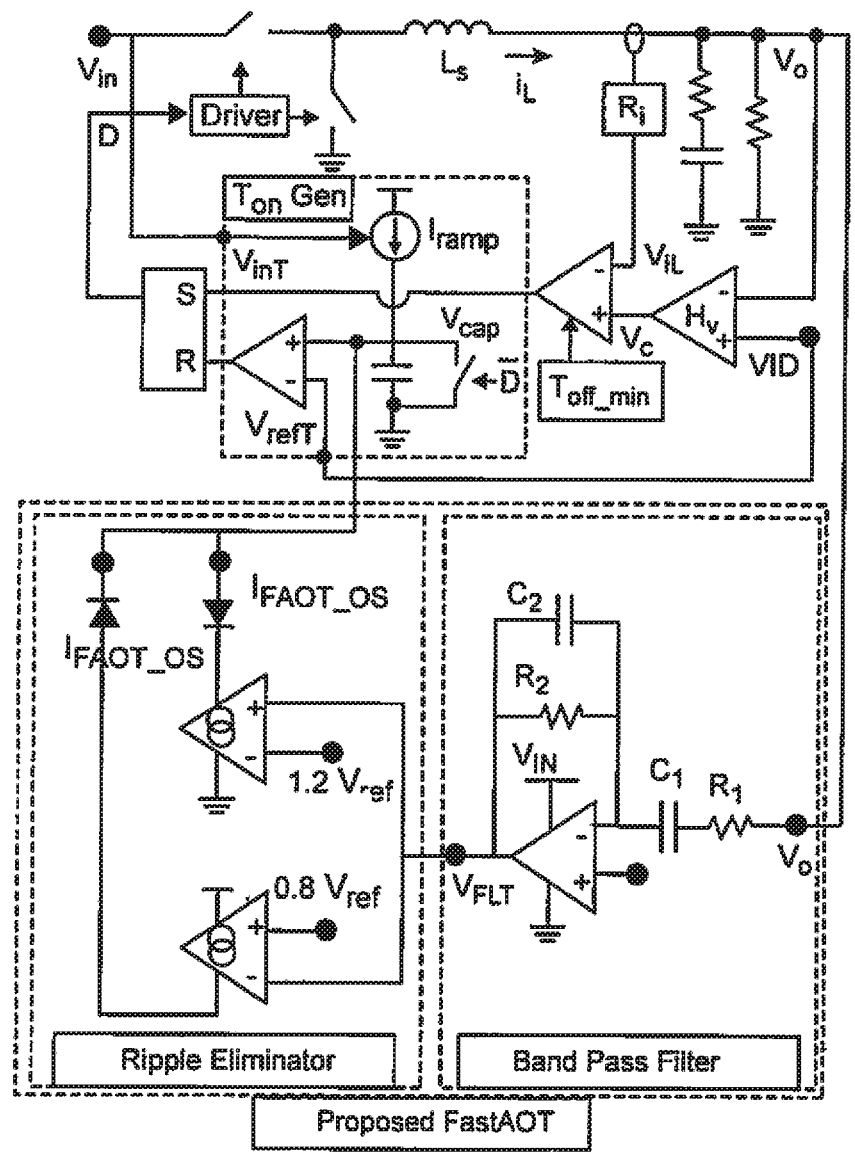
FIGS. 13A and 13B illustrate operational waveforms of the embodiment of FIG. 13, FIGS. 14 and 15 schematically illustrate further alternative implementations of the invention, and FIGS. 16 and 17 schematically illustrate application of the invention to two types of multi-phase power converters.
Figures 13A, 13B:
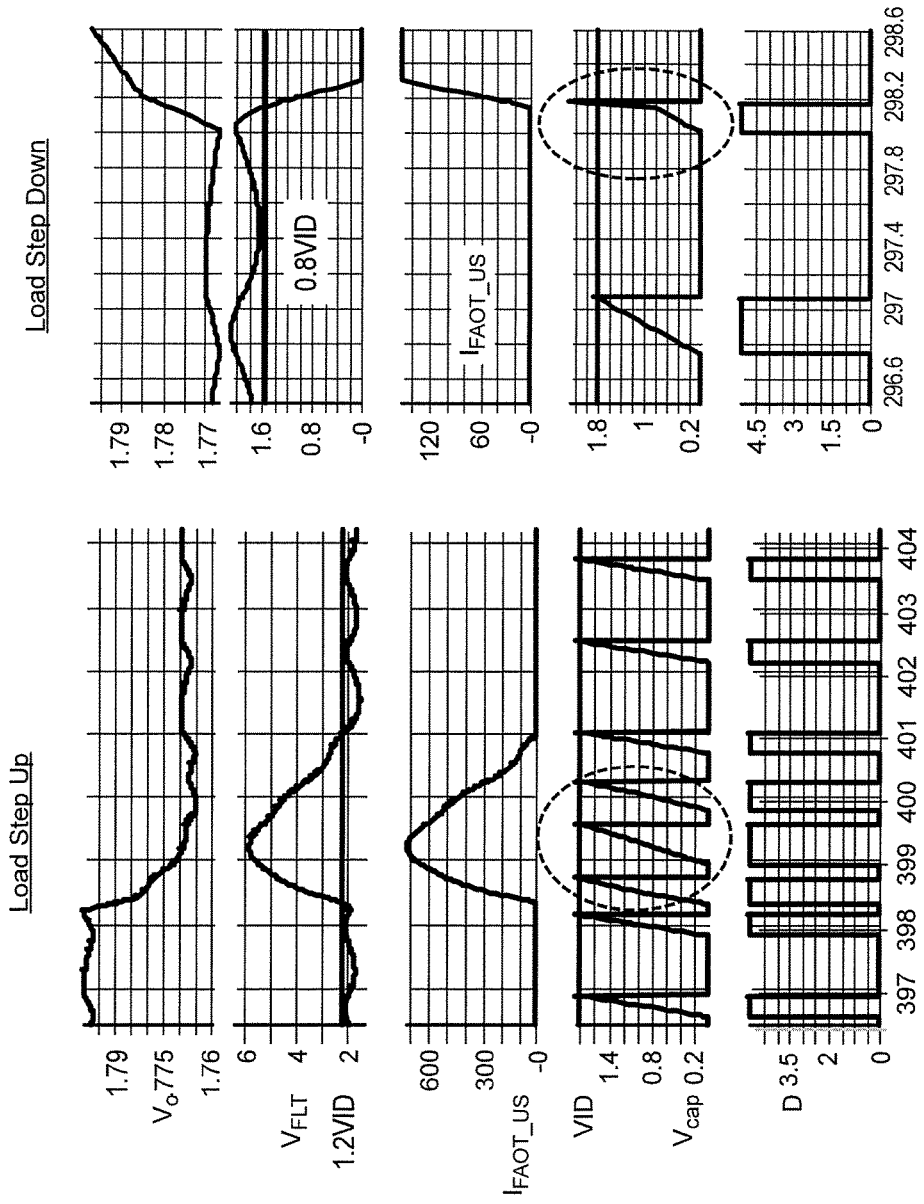

Referring now to FIG. 13, a more generalized embodiment of embodiment of the FAOT circuit of FIG. 5 will now be discussed. It will be appreciated from a comparison of these two circuits that the emitter follower circuit 53 of FIG. 5 has been replaced by comparator 131 connected similarly to comparator 54 except that $V_{FLT}$ is connected to the positive input and the negative input receives a voltage in excess of VID. Comparators 54 and 131 are preferably embodied as transconductance amplifiers, as illustrated. The filter 52 remains unchanged. In this embodiment, the ripple elimination, thresholding and polarity detection of $V_{FLT}$ is performed by comparators 54, 131 and adjustment of the thresholds for operation of the FAOT circuit can be directly and independently set whereas, in the embodiment of FIG. 5 setting a step-up threshold would involve either design of emitter follower 53 or alteration of gain of filter 52 and consequent adjustment of the voltage applied to comparator 54.

Figure 14:
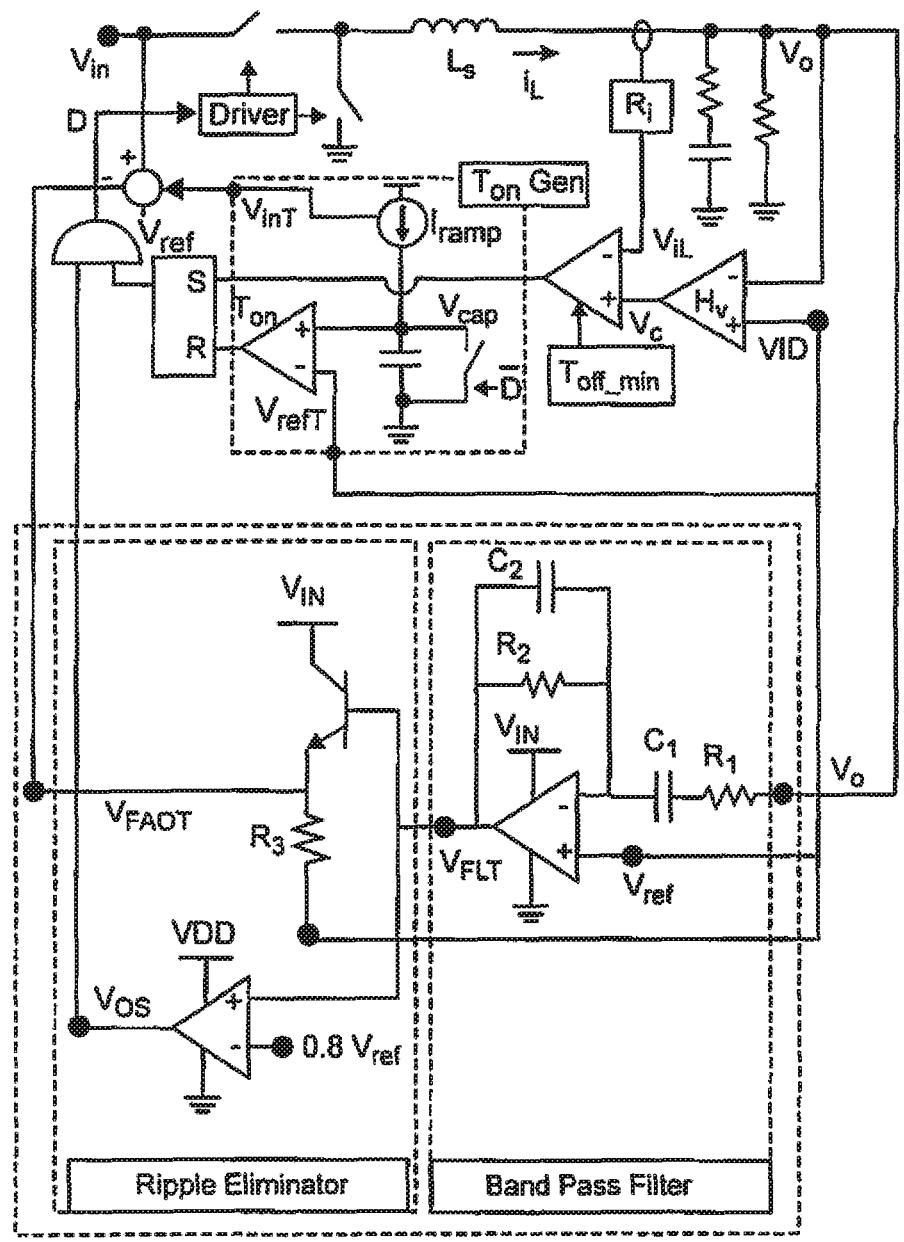

Referring now to FIG. 14, an implementation providing additional voltage control at $V_{inT}$ is shown. In this embodiment of the invention, the FAOT signal is removed from the $V_{refT}$ input of the on-time generator to which $V_{ref}$ is then applied, and connected to a negative input to an adder also receiving $V_{in}$ and $V_{ref}$ on positive inputs to be subtracted from the $V_{inT}$ input to the $T_{on}$ generator. Therefore, when undershoot at $V_O$ creates a peak at the output of the emitter follower 53, the voltage at $V_{inT}$ will be lower and proportional to the $V_O$ undershoot. This reduces the charging current $I_{ramp}$ and the rate of increase of $V_{cap}$ to increase $T_{on}$.

Figure 15:
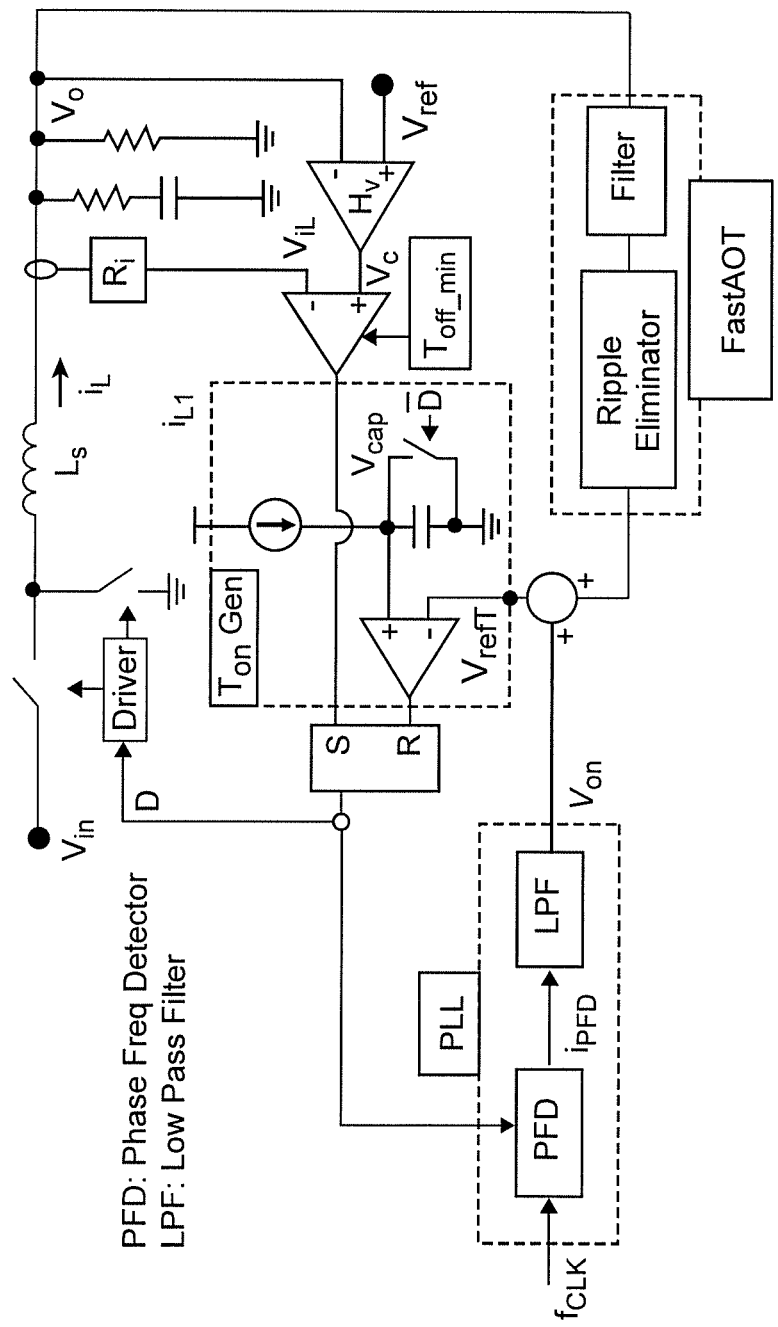

It is also sometimes desired to use a phase-locked loop (PLL) to cause the switching frequency to be constant or to synchronize switching for multi-phase power converters. FIG. 15 illustrates an exemplary implementation of the invention with a PLL. In this case, the FAOT signal is generated in the same manner as in any of the embodiments/implementation discussed above but is added to the low-pass filtered output of a phase frequency detector that outputs a pulse train of constant amplitude at a frequency corresponding to a phase or time difference between input pulse trains (e.g. the $T_{on}$ pulses and a fixed frequency clock, $f_{clk}$). Since the function of a PLL is to adjust the duty cycle of the $T_{on}$ pulses to develop the needed duty cycle for a given load at the clock frequency rate, the combining of the (positive or negative as in FIG. 13) FAOT signal with the $V_{on}$ signal can increase or decrease $T_{on}$ very quickly.

When it is desired to use a plurality of power converters in parallel to supply power to a load, it is also desirable that power pulses output from the respective, parallel connected power converters be properly interleaved so that the power delivery will be evenly distributed over time. Two types of interleaving arrangements commonly used are using a phase manager to deliver signals to initiate $T_{on}$ pulses in sequence to the respective phases or to use PLLs synchronized to fixed frequency clocks of different phases. Use of a phase manager is the simpler of the two types of interleaving arrangements but has much slower transient response.

Figure 16:
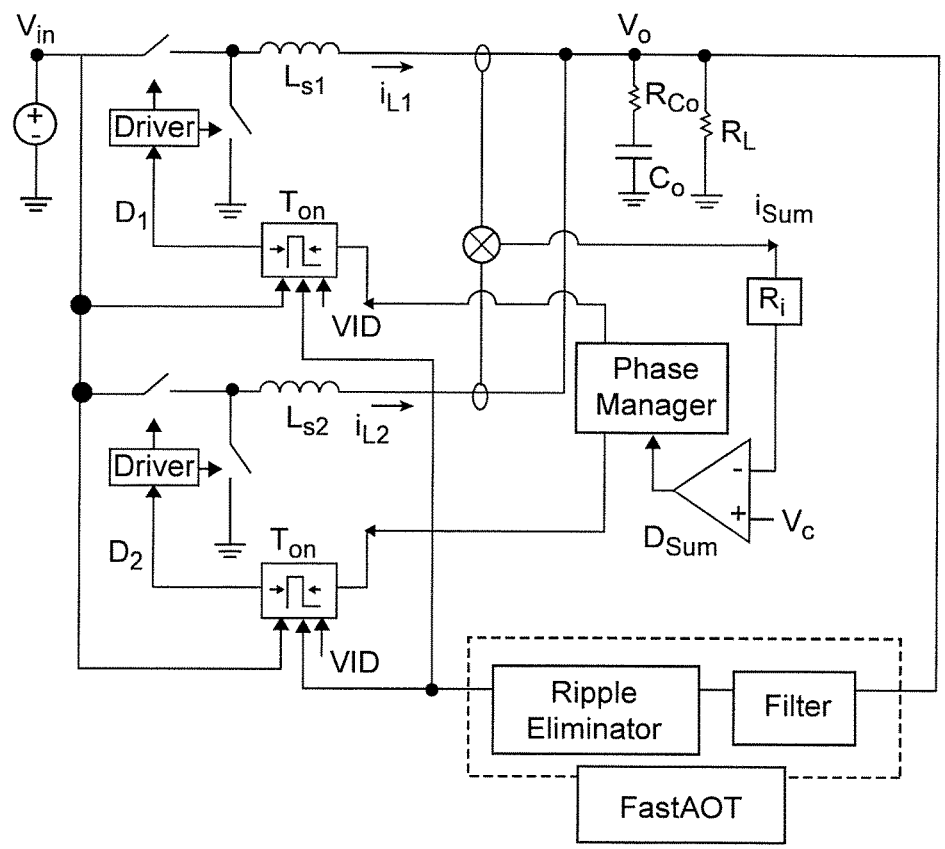

Application of the invention to a multi-phase power converter using a phase manager is shown in FIG. 16. In this embodiment, the output voltage (which is regulated to match a reference voltage and develop a control voltage $V_c$) is monitored as discussed above in connection with FIG. 5 and the (positive or negative) output of the FAOT circuit (see FIG. 13) circuit is input to each of the on-time generators; again, as discussed above in connection with FIG. 5. This effectively provides AOT control by $V_{in}$–$V_{ref}$ sensing with the inclusion of FAOT using a single FAOT circuit to control all phases of the power converter.

Figure 17:
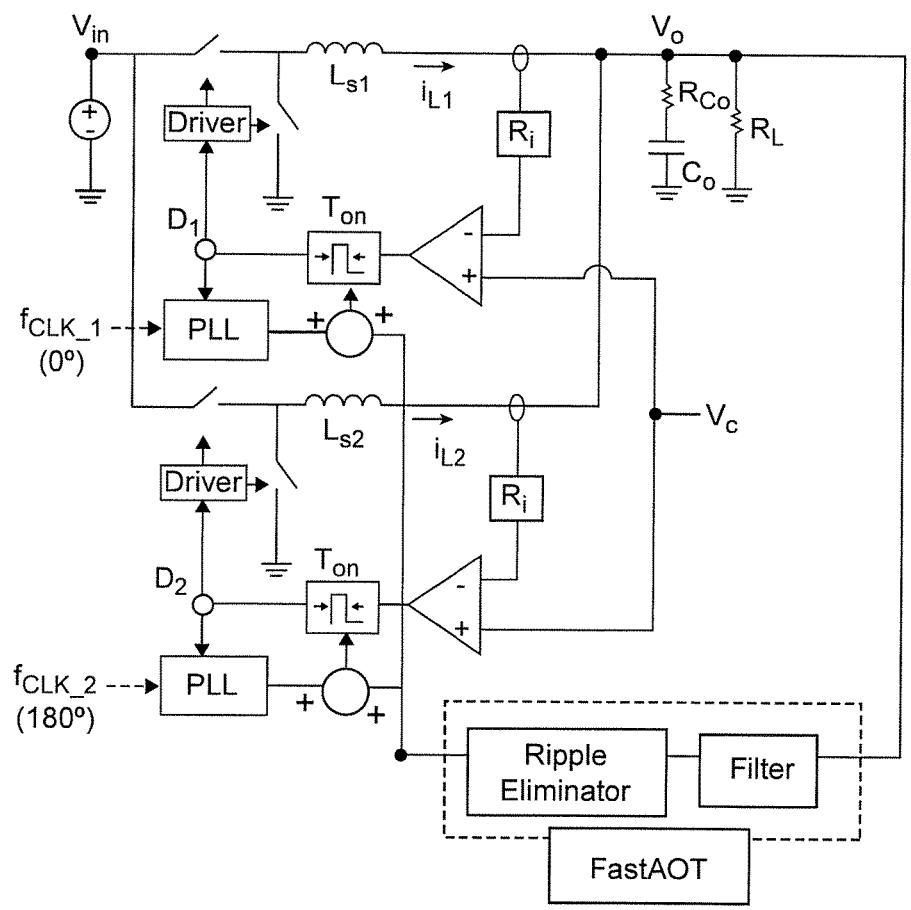

Application of the invention to a multi-phase converter using PLL for inter-leaving is shown in FIG. 17. While a PLL is illustrated in the power converter of each phase, a single PLL in one phase with a phase delay for remaining phases or a combination thereof for larger numbers of phases can also be used as disclosed in concurrently filed U.S. patent application Ser. No. 14/674,680 which is hereby fully incorporated by reference. Only a single FAOT circuit is required to improve the transient response of all phases. The positive or negative FAOT circuit output is added to the output of the PLL of all phases as described above in connection with FIG. 15 and can quickly extend or shorten any active $T_{on}$ pulse being currently produced by any phase or delay the start of the next $T_{on}$ pulse of any phase of the multi-phase power converter.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A power converter including
   a power stage including a switching arrangement and an inductor,
   a circuit for providing variable frequency constant on-time or variable frequency adaptive on-time control of said switching arrangement,
   a detector for detecting a step-up or step-down load transient, and
   a control generator responsive to said detector for interrupting operation of said circuit providing variable frequency constant on-time or variable frequency adaptive on-time control of said switching arrangement for a duration of said step-up or step-down transient, wherein said detector includes
   a filter, and
   a comparator circuit applying a threshold to a detected step-up or step-down load transient whereby said duration of said step-up or step-down transient is determined.

2. The power converter as recited in claim 1, wherein said power stage has a buck converter topology.

3. The power converter as recited in claim 1, wherein said circuit for controlling on-time of said switching circuit provides constant on-time control.

4. The power converter a recited in claim 1, wherein said control generator extends duration of said on-time of said switching arrangement upon detection of a step-up load transient.

5. The power converter a recited in claim 1, wherein said control generator terminates on-time of said switching arrangement upon detection of a step-down load transient.

6. The power converter as recited in claim 1, wherein said circuit for controlling on-time of said switching circuit provides adaptive on-time control.

7. The power converter as recited in claim 1, wherein said detector discriminates between step-up and step-down load transients.

8. The power converter a recited in claim 7, wherein said detector circuit includes an emitter follower circuit.

9. The power converter as recited in claim 1, wherein said detector further includes
   a ripple eliminator circuit.

10. The power converter a as recited in claim 9, wherein said filter is a band-pass filter circuit and wherein said detector circuit includes
    a first comparator receiving an output of said band-pass filter for comparison with a voltage less than a reference voltage, and
    a second comparator receiving an output of said band-pass filter for comparison with a voltage greater than a reference voltage.

11. The power converter as recited in claim 10, wherein said first comparator and said second comparator are transconductance amplifiers.

12. The power converter as recited in claim 1 wherein an output of said control generator is applied directly to said circuit for providing variable frequency constant on-time or variable frequency adaptive on-time control of said switching arrangement.

13. The power converter as recited in claim 1 wherein an output of said control generator is applied to a gate receiving an output of said circuit for providing variable frequency constant on-time or variable frequency adaptive on-time control of said switching arrangement.

14. The power converter as recited in claim 1 wherein an output of said control generator is combined with an input voltage to said power converter to produce a result and the result applied directly to said circuit for providing variable frequency constant on-time or variable frequency adaptive on-time control of said switching arrangement.

15. The power converter as recited in claim 1 wherein said power converter is a multi-phase power converter.

16. The power converter as recited in claim 15 wherein interleaving power pulses is performed using a phase manager.

17. The power converter as recited in claim 15 wherein interleaving of power pulses is performed using a phase-locked loop.

18. The power converter a recited in claim 9, wherein said ripple eliminator circuit includes
    an emitter follower circuit.

19. The power converter as recited in claim 10, wherein said band-pass filter circuit is a high frequency band-pass filter circuit which passes frequencies sufficiently high to pass the highest anticipated slew rate of a detected load transient with relatively low attenuation.

* * * * *